United States Patent
Hu et al.

(10) Patent No.: US 10,048,456 B2
(45) Date of Patent: Aug. 14, 2018

(54) PACKAGING DEVICE OF SINGLE OPTICAL MULTIPLEXED PARALLEL OPTICAL RECEIVER COUPLING SYSTEM COMPONENT AND THE SYSTEM THEREOF

(71) Applicant: Linktel Technologies Co., Ltd., Wuhan (CN)

(72) Inventors: Dingkun Hu, Wuhan (CN); Jian Zhang, Wuhan (CN); Xianwen Yang, Wuhan (CN); Tianshu Wu, Wuhan (CN); Linke Li, Wuhan (CN)

(73) Assignee: Linktel Technologies Co., Ltd., Wuhan (CN)

( * ) Notice: Subject to any disclaimer, the term of this patent is extended or adjusted under 35 U.S.C. 154(b) by 0 days.

(21) Appl. No.: 15/625,991

(22) Filed: Jun. 16, 2017

(65) Prior Publication Data

US 2018/0172929 A1    Jun. 21, 2018

(30) Foreign Application Priority Data

Dec. 15, 2016    (CN) .......................... 2016 1 1162592

(51) Int. Cl.
*G02B 6/42*    (2006.01)

(52) U.S. Cl.
CPC ........... *G02B 6/4256* (2013.01); *G02B 6/425* (2013.01); *G02B 6/4206* (2013.01); *G02B 6/4255* (2013.01); *G02B 6/4269* (2013.01); *G02B 6/4281* (2013.01); *G02B 6/4292* (2013.01)

(58) Field of Classification Search
None
See application file for complete search history.

(56) References Cited

U.S. PATENT DOCUMENTS

| | | | |
|---|---|---|---|
| 6,939,058 B2 * | 9/2005 | Gurevich | G02B 6/4206 385/88 |
| 7,118,293 B2 * | 10/2006 | Nagasaka | G02B 6/4214 385/89 |

(Continued)

*Primary Examiner* — Tina Wong
(74) *Attorney, Agent, or Firm* — Standley Law Group LLP

(57) ABSTRACT

The present invention provides a packaging device of single optical multiplexed parallel optical receiver coupling system component, comprising a housing having a transmission function, an adapter component and collimating lens. The upper surface of the housing is provided with a first groove and a second groove, the lower surface of the housing is provided with a third groove. One end of the housing is provided with a through hole which communicates with the first groove. One end of the collimating lens is connected with the adapter component, and the other end of the collimating lens passes through the through hole to the first groove. A first slope and a second slope are respectively provided on the adjacent side wall between the first groove and the second groove. The second slope is provided with a reflective film. The third groove is provided with a lens array having multiple channels. The packaging device by mechanical structure alignment and active coupling method so as to greatly reduce the number of optical elements required to be accurately positioned on the optical path in the parallel transceiver optical module, greatly simplify the optical alignment process, more easily realize mass production of the optical packaging of corresponding products, which reduces the cost of the optical packaging of corresponding products.

8 Claims, 3 Drawing Sheets

(56) References Cited

U.S. PATENT DOCUMENTS

| | | | | |
|---|---|---|---|---|
| 7,539,367 B2* | 5/2009 | Tamura | G02B 6/4214 | 385/14 |
| 8,283,678 B2* | 10/2012 | Morioka | G02B 6/4214 | 257/82 |
| 8,641,296 B2* | 2/2014 | Nishimura | G02B 6/425 | 385/31 |
| 8,787,714 B2* | 7/2014 | Morioka | G02B 6/4214 | 385/15 |
| 8,876,408 B2* | 11/2014 | Wohlfeld | G02B 6/4214 | 385/88 |
| 8,939,657 B2* | 1/2015 | Hung | G02B 6/42 | 385/89 |
| 9,057,852 B2* | 6/2015 | Morioka | G02B 6/4286 | |
| 9,063,281 B2* | 6/2015 | Lin | G02B 6/4286 | |
| 9,063,304 B2* | 6/2015 | Ohta | G02B 6/4214 | |
| 9,134,494 B2* | 9/2015 | Wang | G02B 6/32 | |
| 9,158,071 B2* | 10/2015 | Nishimura | G02B 6/32 | |
| 9,223,098 B2* | 12/2015 | Morioka | G02B 6/4214 | |
| 9,310,571 B2* | 4/2016 | Hung | G02B 6/4214 | |
| 9,389,375 B2* | 7/2016 | Kanke | G02B 6/4214 | |
| 9,435,963 B2* | 9/2016 | Charbonneau-Lefort | G02B 6/4206 | |
| 2005/0218305 A1* | 10/2005 | Tsukamoto | G02B 6/4206 | 250/216 |
| 2009/0252455 A1* | 10/2009 | Ohta | G02B 6/4214 | 385/42 |
| 2013/0266260 A1* | 10/2013 | Morioka | G02B 6/4214 | 385/33 |

* cited by examiner

PACKAGING DEVICE OF SINGLE OPTICAL MULTIPLEXED PARALLEL OPTICAL RECEIVER COUPLING SYSTEM COMPONENT AND THE SYSTEM THEREOF

CROSS-REFERENCE TO RELATED APPLICATIONS

This application claims priority of China patent application No. 201611162592.2 filed on Dec. 15, 2016, entitled "Packaging Device of Single Optical Multiplexed Parallel Optical Receiver Coupling System Component and the System thereof", which is incorporated herein by reference in its entirety.

FIELD OF THE TECHNOLOGY

The present invention belongs to the technical field of optical packaging technology, especially relates to a packaging device of single optical multiplexed parallel optical receiver coupling system component and the system thereof.

BACKGROUND

Accompanied by the process of digitization, processing, storage and transmission of data have been rapidly developed. The rapid growth of search services and video services of large amounts of data has greatly driven the development of data center based on supercomputers and storage. 40G/100G QSFP+optical module as a main product of interconnection application of a short-range data center has a broad market prospect. The design idea of the optical module of the data center is to provide a higher access density through a smaller volume and lower cost, and ultimately improve the user access capacity.

Parallel transceiver optical module can increase the transmission bandwidth due to the lower energy consumption in the smaller space, and the corresponding research and development began to accelerate. The prior data center uses a long-distance transmission optical module. The optical receiver included in the module always comprises a BOX with multilayer ceramic circuits, an adapter with a standard optical interface, optical collimating lens, an optical demultiplexer, an optical reflective mirror, a focusing lens array and a PD array. In the corresponding optical path, they are aligned and coupled one by one. This solution involves a lot of optical package elements. Every element needs to be coupled with high-precision in a free space. And the small deviation of the optical path is required after the relative position is fixed.

However, each component requires precise positioning so as to ensure high coupling efficiency, resulting in complex optical coupling process, high process control requirement, which is not conducive to mass production of large-scale.

SUMMARY

The aim of the present application is to overcome the problem that the prior parallel transceiver optical module corresponds too many optical package elements, the element positioning accuracy is highly required, the installation deviation is required to be small after being fixed, the process is complex, the technological requirement is high, and it is not conducive to mass production of large-scale.

For this reason, the present invention provides a packaging device of single optical multiplexed parallel optical receiver coupling system component, comprising a housing, an adapter component and collimating lens. The upper surface of the housing is provided with a first groove and a second groove, the lower surface of the housing is provided with a third groove. One end of the housing is provided with a through hole which communicates with the first groove. One end of the collimating lens is connected with the adapter component, and the other end of the collimating lens passes through the through hole to the first groove. A first slope and a second slope are respectively provided on the adjacent side wall between the first groove and the second groove. The second slope is provided with a reflective film. The third groove is provided with a lens array having multiple channels.

Further, the housing is made of injection-molded optical plastic.

Further, the first groove contains an island arch for carrying an optical member.

Further, an overflow tank is provided around the island arch.

Further, the first slope is $\alpha$-angle with respect to a vertical plane of the housing, $\alpha$ is 0 to 15 degrees, and the second slope is $\beta$-angle with respect to the vertical plane of the housing, $\beta=45-\alpha/2+\arcsin[(\sin \alpha)/n]/2$, n is refractive index of material of the housing.

Further, a lens surface of the lens array is aspherical.

Further, one end of the adapter component is a standard optical interface and the other end is a pin metal piece. The pin metal piece contains a ceramic rod. One end of the ceramic rod exposes out of the pin metal piece, and connects to the collimated lens. The collimating lens and the ceramic rod are located in the through hole.

Further, the ceramic rod is connected with the collimating lens by a ceramic pipe. A connecting gap between the ceramic rod and the collimating lens are filled with refractive index matching glue.

Further, the pin metal piece, the ceramic pipe and the housing are fixed with each other by filling with optical glue.

In addition, the present invention further provides a single optical multiplexed parallel optical receiver coupling system, including a packaging device of single optical multiplexed parallel optical receiver coupling system component, an optical demultiplexer, a flexible circuit, a metal heat sink, a PD chip array and a TIA chip. The optical demultiplexer is coupled and fixed in the first groove. The flexible circuit is mounted on the metal heat sink. The PD chip array and the TIA chip are installed on the flexible circuit. The PD chip array and the TIA chip are located in the third groove. The PD chip array corresponds to the lens array in the third groove. The metal heat sink is fixed on the lower surface of the housing.

Compared with the prior art, the present invention has the advantages that the packaging device of single optical multiplexed parallel optical receiver coupling system component provided by the present invention uses the housing by mechanical structure alignment and active coupling method so as to greatly reduce the number of optical elements required to be accurately positioned on the optical path in the parallel transceiver optical module, greatly simplify the optical alignment process, more easily realize mass production of the optical packaging of corresponding products, which reduces the cost of the optical packaging of corresponding products.

BRIEF DESCRIPTION OF THE DRAWINGS

The present invention is described in detail below through embodiments accompanied with drawings.

Figure 1:
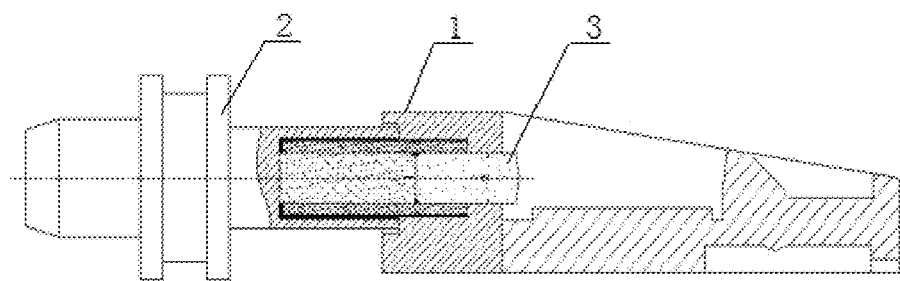
FIG. 1 is an overall structure diagram of the packaging device of single optical multiplexed parallel optical receiver coupling system component in the present invention.

REFERENCE NUMERALS 1. housing; 2. adapter component; 3. collimating lens; 4. optical glue; 5. optical demultiplexer; 6. flexible circuit; 7. metal heat sink; 8. PD chip array; 9. TIA chip; 11. through hole; 12. first groove; 13. island arch; 14. first slope; 15. second slope; 16. second groove; 17. third groove; 18. lens array; 21. standard optical interface; 22. pin metal piece; 23. ceramic pipe; 24. ceramic rod

DETAILED DESCRIPTION

The embodiments of the present invention will now be described clearly and completely with reference to drawings in the embodiments of the present invention, and it will be apparent that the described embodiments are merely part of the embodiments of the present invention and are not intended to be exhaustive. All other embodiments obtained by those of ordinary skill in the art based on embodiments in the present invention without making creative work are within the scope of the present invention.

Embodiment I:

As shown in FIG. 1, the present embodiment provides a packaging device of single optical multiplexed parallel optical receiver coupling system component, comprising: a housing 1, an adapter component 2 and collimating lens 3. An upper surface of the housing 1 is provided with a first groove 12 and a second groove 16. An optical member is coupled and positioned in the first groove 12. A lower surface of the housing 1 is provides with a third groove 17. One end of the housing 1 is provided with a through hole 11. The through hole 11 communicates with first groove 12. One end of the collimating lens 3 is connected with the adapter component 2, and the other end of the collimating lens 3 passes the through hole 11 to the first groove 12. A first slope 14 and a second slope 15 are respectively provided on the adjacent side wall between the first groove 12 and the second groove 16. The second slope 15 is provided with a reflective film. The third groove 17 is provided with a lens array 18 having multiple channels. The optical member is an optical demultiplexer 5. The incident light enters the collimator lens 3 through the adapter component 2 and is shaped and then decomposed into multiplexed parallel lights by the optical demultiplexer in the first groove 12. The multiplexed parallel lights are bent at an angle θ by the first slope 14, and the bent lights are reflected by the second slope 14 to focus on the lens array 18. The design of the first slope 14 makes the incident light bent to avoid reflection of the incident light, so that all the lights can be reflected by the second slope 15 to the lens array.

Figure 2:
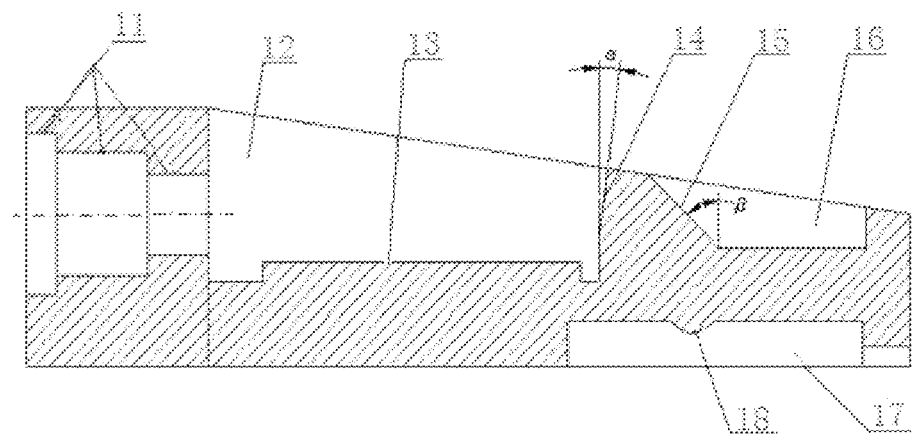
FIG. 2 is a schematic view showing the structure of the housing in the present invention.

As an embodiment in more detail, as shown in FIG. 2, the housing 1 is made of an injection-molded optical plastic. The first groove 12 is provided with an island arch 13 for carrying the optical member. The size of the island arch 13 is similar to the size of the carried optical member, preferably the size of the island arch 13 is slightly smaller than the size of the optical member. The height of the island arch relates to the optical member carried. The optical member is positioned by coupling with the collimating lens 3 on the island arch 13. The optical member and the island arch 14 are fixed by the optical glue 4. In order to prevent the optical glue 4 from overflowing to the optical plane of the optical member and blocking light transmission when the optical member is positioned by coupling, an overflow tank is provided around the island arch 13. The first slope 14 is α-angle with respect to a vertical plane of the housing 1, α is 0 to 15 degrees, preferably, α is 8 degree. The second slope 15 is β-angle with respect to the vertical plane of the housing 1, β=45−α/2+arcsin[(sin α)/n]/2, n is refractive index of material of the housing. A lens surface of the lens array 18 is aspherical. The magnitude of the lateral offset of the lens array 18 also depends on the optical member on the island arch 13.

Figure 3:
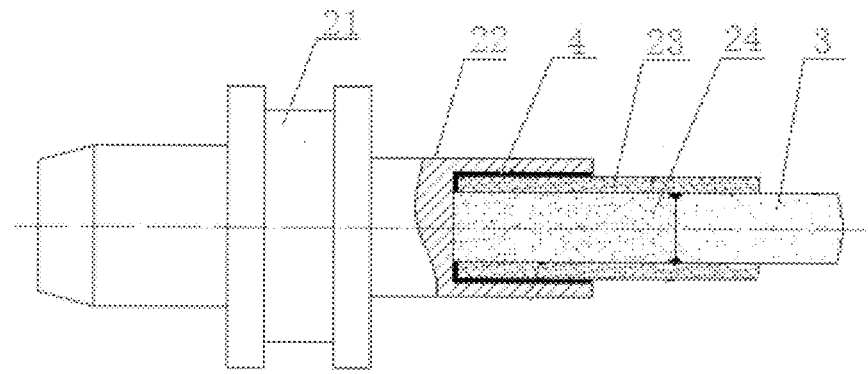
FIG. 3 is a schematic view showing the assembly of the collimating lens and the adapter component in the present invention.

As shown in FIG. 3, one end of the adapter component 2 is a standard optical interface 21, the other end is a pin metal piece 22. The pin metal piece 22 contains a ceramic rod 24. One end of the ceramic rod 24 exposes out of the pin metal piece 22, and connects to the collimating lens 3. The collimator lens 3 is cylindrical. After grinding, the outer diameter of the collimator lens 3 is the same as the outer diameter of the ceramic rod 24 of the adapter component 2. The connecting end of the collimator lens 3 and the ceramic rod 24 is optically ground to a PC surface. In order to make the ceramic rod 24 and the collimator lens 3 better positioned, the ceramic rod 24 is aligned with the collimator lens 3 by the ceramic pipe 23. The ceramic pipe 23 may be a closed ceramic pipe, an open ceramic pipe, or a specially processed high precision cylindrical member used in the processing of the adapter component 2. In addition, the connecting gas between the ceramic rod 24 and the collimating lens 3 is filled with refractive index matching glue. After the glue is cured, the collimator lens 3 and the ceramic rod 24 are firmly connected. The pin metal piece 22 and the ceramic pipe 23 are fixed by filling the optical glue 4 between them.

Figure 4:
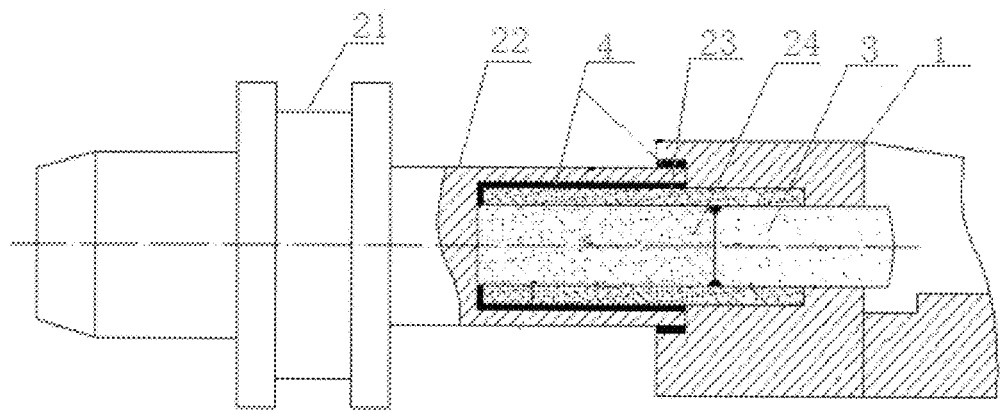
FIG. 4 is a schematic view showing the assembly of the adapter component and the housing.

As shown in FIG. 4, in order to facilitate the positioning of the adapter component 2 with the collimator lens 3, there is a plurality of through holes 11 in the end face of the housing 1. The apertures of the through holes 11 coaxially decrease along the housing 1 from outer to inner. In the present embodiment, there are three through holes 11 whose The aperture size is in descending order equal to the outer diameter of the pin metal piece 22, the outer diameter of the ceramic pipe 23, and the outer diameter of the collimator lens 3. The adapter component 2 with the collimator lens 3 is connected to the housing 1 by the through holes 11. The collimator lens 3 penetrates through the through hole 11 into the first groove 12. The ceramic pipe 23 engages the intermediate through hole. The pin metal pipe 22 engages the outer end hole. The pin metal piece 22 and the housing 1 are fixed by filling optical glue 4 between them.

Figure 5:
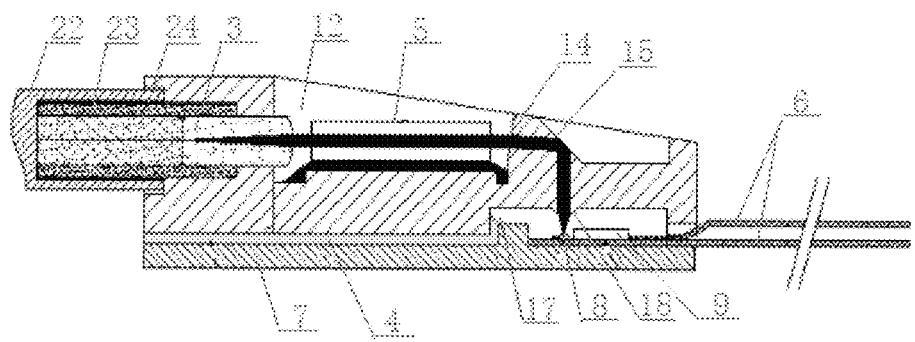
FIG. 5 is a structure diagram of the single optical multiplexed parallel optical receiver coupling system in the present invention.

Embodiment II:

The present embodiment is a specific implementation of the packaging device of single optical multiplexed parallel optical receiver coupling system component in the above Embodiment I in an optical packaging of the 100G high-speed LAN-WDM optical module receiver. As shown in FIG. 5, an LAN-WDM optical demultiplexer 5 is coupled and fixed to the island arch 13 of the first groove 12, a flexible circuit 6 is mounted on a metal heat sink 7, a four-channel PD chip array 8 and a four-channel TIA chip 9 are mounted on the flexible circuit board 6 through a high-precision placement machine. And then by wire bonding, a soft belt is electrically connected with the PD chip and the TIA chip. The metal heat sink 7 mounted with the flexible circuit board 6 is fixed on the lower surface of the housing 1 by optical glue 4. The PD chip array 8 and the four-channel TIA chip 9 on the flexible circuit board 6 are located in the third groove 17. The PD chip array 8 corresponds to the lens array 18 of the third groove 17. The lens array 18 in the present embodiment is also four-channel. By adjusting the relative positions by coupling among the flexible circuit board 6, the LAN-WDM optical demultiplexer 5 and the packaging device of single optical multiplexed parallel optical receiver coupling system component in the present invention, the photosensitive surface of the four-channel PD chip array 8 is aligned with four incident lights from the lens array 18. And then, the PD chip array 8 converts the optical signal into an electrical signal so as to complete the optical packaging of the receiving end of the optical device.

Figure 6:
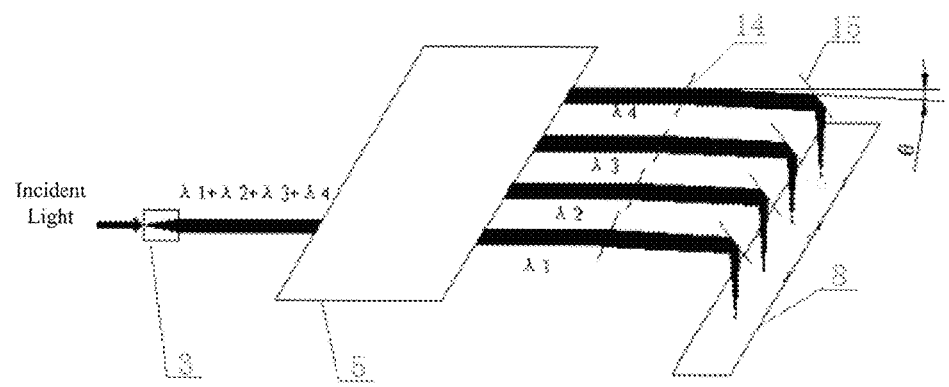
FIG. 6 is a schematic diagram of the optical path principle of the optical packaging in Embodiment II.

As shown in FIG. 6, the optical path principle of the optical packaging of the present embodiment is as follows: the incident light entering the adapter component 2 contains four mixed wavelengths $\lambda 1$, $\lambda 2$, $\lambda 3$, and $\lambda 4$, after the incident light enters the collimator lens 3, the collimator lens 3 shapes the light beam and converts the divergent light having a certain incident angle into collimated light; then, the collimated light containing four wavelengths is decomposed into single wavelengths of wavelengths $\lambda 1$, $\lambda 2$, $\lambda 3$, and $\lambda 4$ by adjusting the relative position of the LAN-WDM optical demultiplexer 5 by coupling; four single-wavelength lights pass through the first slope 14 and bend; the bent lights pass through the second slope 15 and are reflected and then are incident onto the fours channels of the PD chip array 8 respectively via the four channels of the lens array 18; the PD chip array 8 converts the optical signal into an electrical signal so as to realize the photodetection function.

Above all, the packaging device of single optical multiplexed parallel optical receiver coupling system component provided by the present invention uses the housing by mechanical structure alignment and active coupling method so as to greatly reduce the number of optical elements required to be accurately positioned on the optical path in the parallel transceiver optical module, greatly simplify the optical alignment process, more easily realize mass production of the optical packaging of corresponding products, which reduces the cost of the optical packaging of corresponding products.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the scope of the present invention and covered in the claims of the present invention.

What is claimed is:

1. A single optical multiplexed parallel optical receiver coupling system, comprising a packaging device of single optical multiplexed parallel optical receiver coupling system component, an optical demultiplexer, a flexible circuit, a metal heat sink, a PD chip array and a TIA chip;

wherein, the packaging device comprises a housing having a transmission function, an adapter component and collimating lens, an upper surface of the housing is provided with a first groove and a second groove, a lower surface of the housing is provided with a third groove, one end of the housing is provided with a through hole which communicates with the first groove, one end of the collimating lens is connected with the adapter component, the other end of the collimating lens passes through the through hole to the first groove, a first slope and a second slope are respectively provided on an adjacent side wall between the first groove and the second groove, the second slope is provided with a reflective film, the third groove is provided with a lens array having multiple channels;

wherein, the optical demultiplexer is positioned by coupling with the collimating lens on an island arch in the first groove so that multiple single-wavelength lights output from the optical demultiplexer are incident onto multiple channels of the PD chip array respectively via multiple channels of the lens array, the flexible circuit is mounted on the metal heat sink, the PD chip array and the TIA chip are installed on the flexible circuit board, the PD chip array and the TIA chip are located in a third groove, the PD chip array corresponds to lens array in the third groove, the metal heat sink is fixed on a lower surface of the housing.

2. The system according to claim 1, wherein the housing is made of injection-molded optical plastic.

3. The system according to claim 1, wherein the optical demultiplexer and the island arch are fixed by optical glue, and an overflow tank is provided around the island arch.

4. The system according to claim 1, wherein the first slope is $\alpha$-angle with respect to a vertical plane of the housing, $\alpha$ is 0 to 15 degrees; the second slope is $\beta$-angle with respect to the vertical plane of the housing, $\beta=45-\alpha/2+\arcsin[(\sin \alpha)/n]/2$, n is refractive index of material of the housing.

5. The system according to claim 1, wherein a lens surface of the lens array is aspherical.

6. The system according to claim 1, wherein one end of the adapter component is a standard optical interface, the other end is a pin metal piece, the pin metal piece-contains a ceramic rod, one end of the ceramic rod exposes out of the pin metal piece and connects to the collimating lens, the collimating lens and the ceramic rod are located in the through hole.

7. The system according to claim 6, wherein the ceramic rod is aligned with the collimating lens by a ceramic pipe, a connecting gap between the ceramic rod and the collimating lens is filled with refractive index matching glue.

8. The system according to claim 7, wherein the pin metal piece, the ceramic pipe and the housing are fixed with each other by filling with optical glue.

* * * * *